(12) United States Patent
Ahmed et al.

(10) Patent No.: US 9,740,609 B1
(45) Date of Patent: Aug. 22, 2017

(54) GARBAGE COLLECTION TECHNIQUES FOR A DATA STORAGE SYSTEM

(71) Applicant: INTERNATIONAL BUSINESS MACHINES CORPORATION, Armonk, NY (US)

(72) Inventors: Razik S. Ahmed, Houston, TX (US); Timothy J. Fisher, Cypress, TX (US); Aaron D. Fry, Richmond, TX (US); Nikolas Ioannou, Zurich (CH); Jason Ma, Sugar Land, TX (US); Matthew R. Orr, Houston, TX (US); Roman A. Pletka, Zurich (CH); Lincoln T. Simmons, Houston, TX (US); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/047,942

(22) Filed: Feb. 19, 2016

(51) Int. Cl.
*G06F 13/00* (2006.01)
*G06F 12/02* (2006.01)
*G06F 3/06* (2006.01)

(52) U.S. Cl.
CPC ...... *G06F 12/0253* (2013.01); *G06F 12/0246* (2013.01); *G06F 3/0614* (2013.01); *G06F 3/0628* (2013.01); *G06F 3/0685* (2013.01); *G06F 12/0238* (2013.01); *G06F 2212/7205* (2013.01)

(58) Field of Classification Search
CPC .... G06F 3/0614; G06F 3/0628; G06F 3/0685; G06F 12/0253; G06F 12/0246; G06F 12/0238; G06F 2212/7205

USPC ........ 711/103, 154, 159, 165; 707/649, 686, 707/787, 813, 820; 710/34, 43, 74; 712/225, 228
See application file for complete search history.

(56) References Cited

U.S. PATENT DOCUMENTS

| | | | |
|---|---|---|---|
| 7,818,525 | B1 | 10/2010 | Frost et al. |
| 7,966,462 | B2 | 6/2011 | Lee et al. |
| 8,166,233 | B2 | 4/2012 | Schibilla et al. |
| 8,397,014 | B2 | 3/2013 | Khmelnitsky et al. |

(Continued)

OTHER PUBLICATIONS

Tsao, Che-Wei et al. (2013). Performance Enhancement of Garbage Collection for Flash Storage Devices: An Efficient Victim Block Selection Design. Proceedings of the 50th Annual Design Automation Conference, Article No. 165, May-Jun. 2013.

*Primary Examiner* — Reba I Elmore
(74) *Attorney, Agent, or Firm* — Michael R. Long; Randall J. Bluestone

(57) ABSTRACT

A technique for garbage collection in a data storage system includes determining a dirty physical byte count for each of a plurality of candidate garbage collection units. The dirty physical byte count provides a total amount of dirty bytes. At least one of a dirty physical codeword container count and a dirty physical page count is determined for each of the candidate garbage collection units. The dirty physical codeword container count provides an amount of physical codeword containers that are completely dirty and the dirty physical page count provides an amount of physical pages that are completely dirty. A garbage collection unit, included in the candidate garbage collection units, is selected for garbage collection based on the dirty physical byte count and at least one of the dirty physical codeword container count and the dirty physical page count.

20 Claims, 12 Drawing Sheets

(56) References Cited

U.S. PATENT DOCUMENTS

| | | |
|---|---|---|
| 8,990,484 B2 | 3/2015 | Kang |
| 9,021,231 B2 | 4/2015 | Fitzpatrick et al. |
| 9,081,663 B2 | 7/2015 | Melik-Martirosian |
| 2012/0063231 A1* | 3/2012 | Wood .................... G11C 16/10 |
| | | 365/185.18 |
| 2015/0026391 A1 | 1/2015 | Su et al. |
| 2015/0058535 A1* | 2/2015 | Lasser ................. G06F 12/0246 |
| | | 711/103 |

* cited by examiner

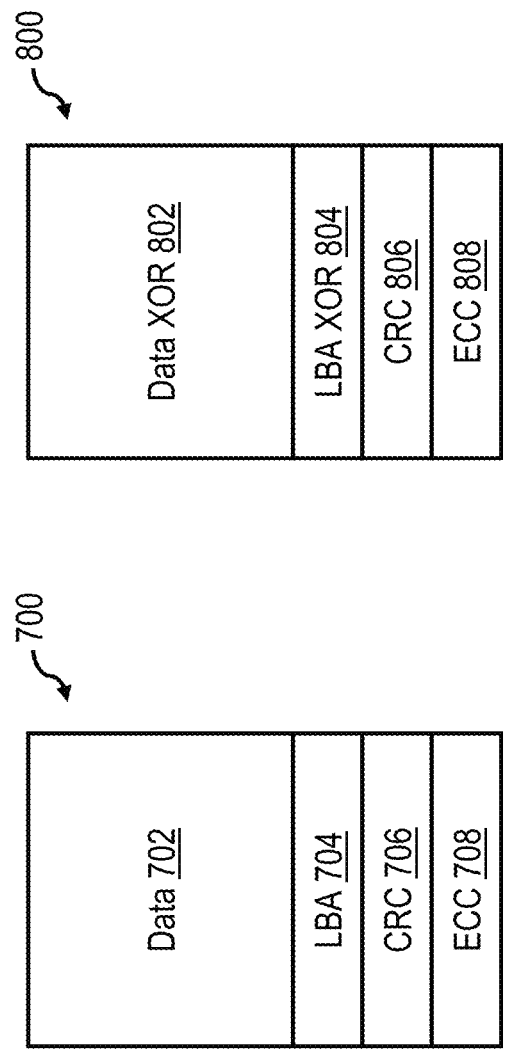

GARBAGE COLLECTION TECHNIQUES FOR A DATA STORAGE SYSTEM

BACKGROUND OF THE INVENTION

The present disclosure is generally directed to garbage collection techniques for a data storage system and, more particularly, to garbage collection techniques for a data storage system that are based on a dirty physical byte count and a completely dirty physical codeword container count.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

In computer science, garbage collection (GC) is a form of automatic memory management in which a garbage collector attempts to reclaim garbage (memory occupied by objects that are no longer in use by a program). With respect to a flash memory, garbage collection involves reading and re-writing data to the flash memory. Data is written to the flash memory in units called pages. However, as noted above, flash memory can only be erased in larger units called blocks (made up of multiple pages). If the data in some of the pages of the block are no longer needed (also called stale, invalid, or dirty pages), only the pages with good data in that block are read and re-written into another previously erased empty block.

Because a flash memory must be erased before the flash memory can be re-written, garbage collection results in re-writing user data and metadata more than once. That is, re-writing some data requires an already used portion of flash memory to be read, updated, and written to a new location, together with initially erasing the new location if the new location was previously used at some point in time. Due to the way flash memory works, much larger portions of flash memory must be erased and rewritten than is usually required by the amount of new data. This multiplying effect (known as write amplification) increases the number of writes required over the life of a flash memory and shortens the time the flash memory can reliably operate.

BRIEF SUMMARY

A technique for garbage collection in a data storage system includes determining a dirty physical byte count for each of a plurality of candidate garbage collection units. The dirty physical byte count provides a total amount of dirty bytes. At least one of a dirty physical codeword container count and a dirty physical page count is determined for each of the candidate garbage collection units. The dirty physical codeword container count provides an amount of physical codeword containers that are completely dirty and the dirty physical page count provides an amount of physical pages that are completely dirty. A garbage collection unit, included in the candidate garbage collection units, is selected for garbage collection based on the dirty physical byte count and at least one of the dirty physical codeword container count and the dirty physical page count.

BRIEF DESCRIPTION OF THE SEVERAL VIEWS OF THE DRAWINGS

FIG. 7 illustrates an exemplary codeword stored in each data page in accordance with the present disclosure;

FIG. 8 depicts an exemplary codeword stored in each data protection page in accordance with the present disclosure;

DETAILED DESCRIPTION

Figure 1A:
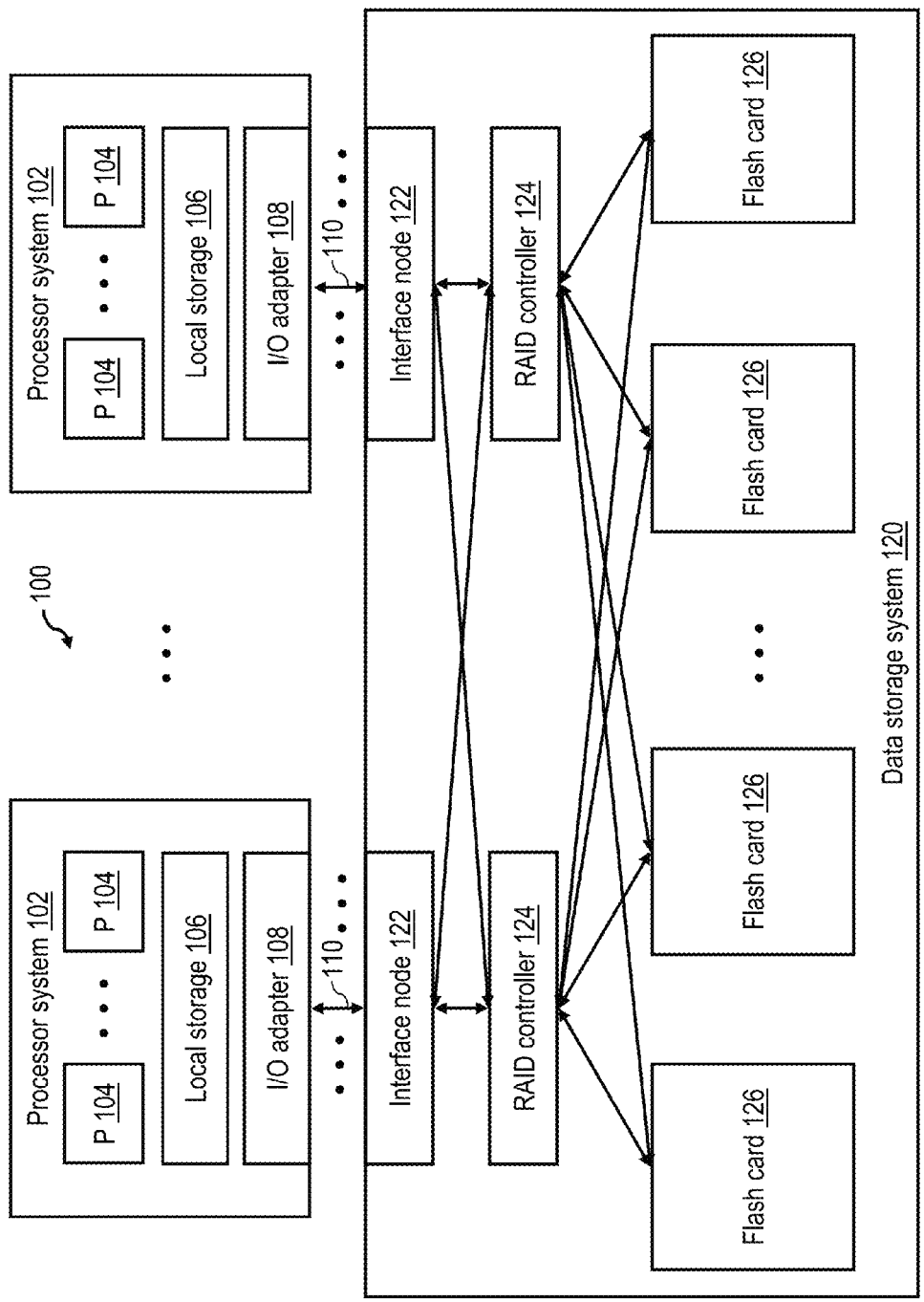
FIG. 1A is a high level block diagram of a data processing environment in accordance with one embodiment.

Due to characteristics of flash memory, a flash controller generally operates in such a way that garbage collection must be performed to reclaim previously used flash blocks. In general, garbage collection results in increased write amplification, as a garbage collection usually re-writes still-valid data from a mostly stale (dirty) flash block. As a general rule, on flash controllers that perfectly align logical page boundaries with physical codeword containers, garbage collection has only been concerned with choosing a candidate flash block stripe that produces the fewest logical page re-writes to reduce write amplification. However, in order to maintain relatively high performance, it is desirable for flash controllers that support in-line data compression (or more generally, unaligned logical pages within physical storage blocks) to take into account physical 'read amplification' in addition to logical 'write amplification' during garbage collection. The smallest readable flash memory granularity (e.g., a physical flash page or an ECC codeword) usually contains more than one logical page and consequently may contain logical pages that do not include valid data but that have to be read to extract still-valid data from other logical pages. On at least one known conventional flash controller, the amount of read data that was thrown away was either zero or insignificant.

One known conventional flash controller selected block stripes for garbage collection based on a dirty logical page count. The dirty logical page count directly correlated to a dirty data percentage within a candidate block stripe (or whatever garbage collection container was used). In this case, logical pages were a constant size and generally aligned with a physical page or codeword boundary. As such, conventional garbage collection block selection approaches have not considered read efficiency, as the effect of read efficiency on conventional garbage collection was insignificant. That is, the amount of physical flash memory read versus the amount of logical data re-written was conventionally about one-to-one. Given that a flash controller may compress logical data pages into a variable physical space based on data compressibility, the number of dirty logical pages within a physical block stripe is no longer an accurate indicator of a good garbage collection candidate. That is, when data compression is employed, a dirty logical page count no longer provides an accurate indication of how much physical data must be re-written (the write amplification) or how much physical data must be read and thrown away (read efficiency) to extract desired logical pages.

According to the various embodiments, techniques that take into account both write amplification and read efficiency when performing garbage collection in a data storage system are disclosed herein.

According to one or more embodiments of the present disclosure, a 'dirty physical byte count' (DPBC) within a block stripe is employed to indicate how many physical bytes are dirty (as contrasted with indicating how many logical pages are dirty). In addition, to facilitate making garbage collection more read efficient, the number of completely dirty physical codeword containers on a block stripe are tracked by a completely 'dirty physical codeword container count' (DPCCC). For two block stripes with equivalent DPBCs, the DPCCC may be used to determine which block stripe is the most read efficient when making a garbage collection decision. Selecting a block stripe for garbage collection based on both a DPBC and a DPCCC facilitates consideration of both write amplification and read efficiency during garbage collection and allows for adapting to current working conditions.

With reference to the figures and with particular reference to FIG. 1A, there is illustrated a high level block diagram of an exemplary data processing environment 100 including a data storage system 120 that is configured to perform garbage collection according to the present disclosure and having a non-volatile memory array as described further herein. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
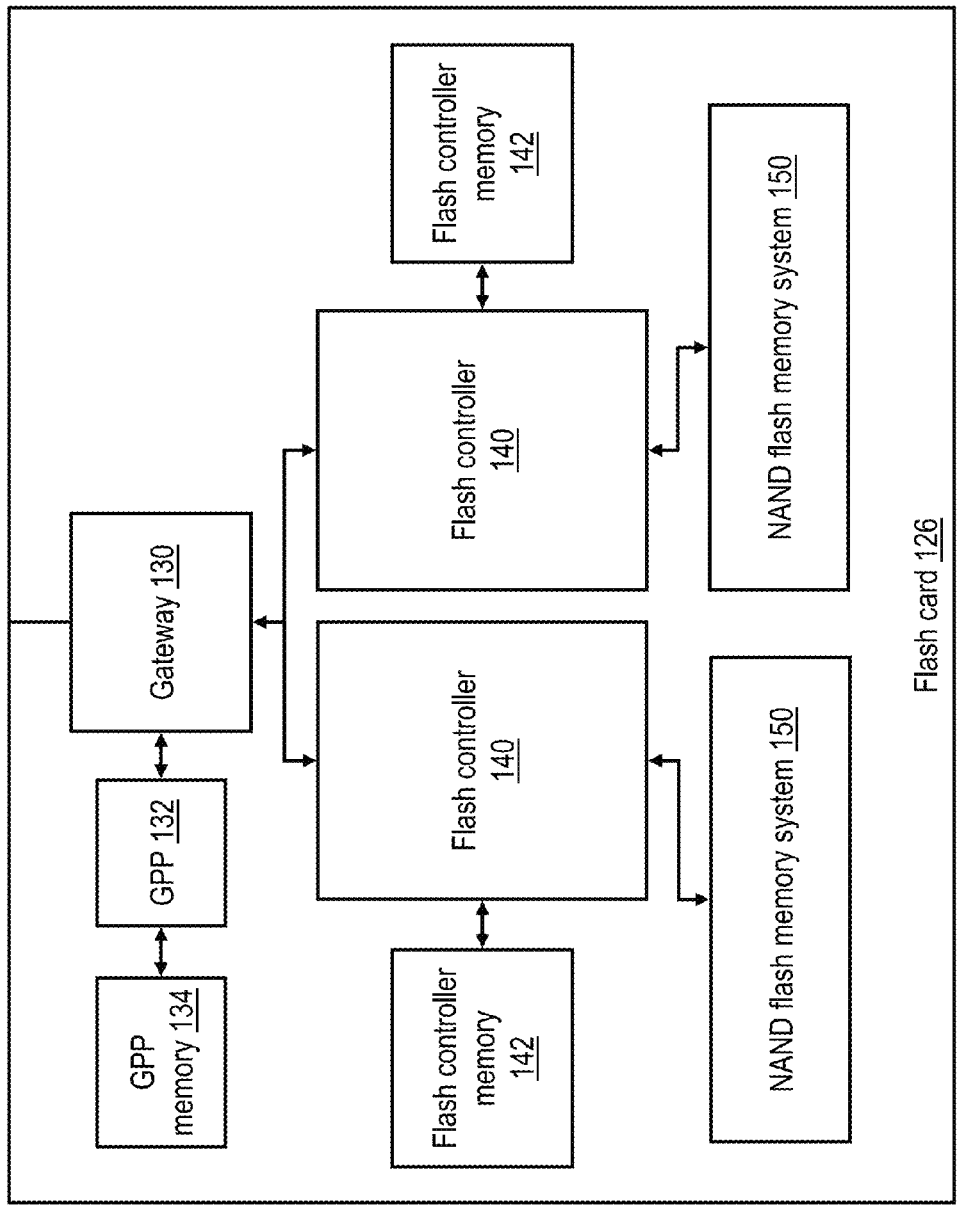
FIG. 1B is a more detailed block diagram of an exemplary flash card of the data storage system of FIG. 1A.

FIG. 1B depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1B) associated with NAND flash memory systems 150.

Flash controllers 140 implement a Flash Translation Layer (FTL) that provides logical-to-physical address translation to enable access to specific memory locations within NAND flash memory systems 150. In general, an TOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the logical page typically having a size of four (4) kilobytes. This logical page can be further compressed by flash controller 140 such that the physical data being written for a logical page can be significantly smaller than 4 kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed sizes of data pages stored in NAND flash memory system 150.

NAND flash memory systems 150 may take many forms in various embodiments. Referring now to FIGS. 2-5, there is depicted one exemplary arrangement of physical memory within a NAND flash memory system 150 in accordance with one exemplary embodiment.

Figure 2:
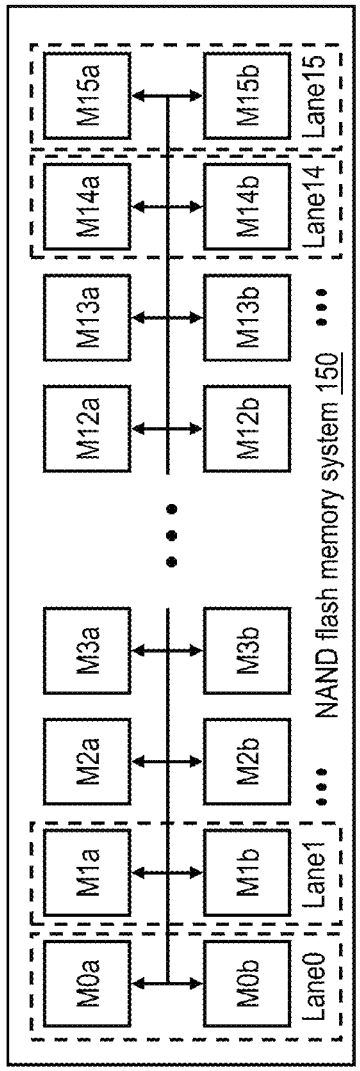
FIGS. 2-5 illustrate an exemplary arrangement of physical memory within a NAND flash memory system in accordance with the present disclosure.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

Figure 3:
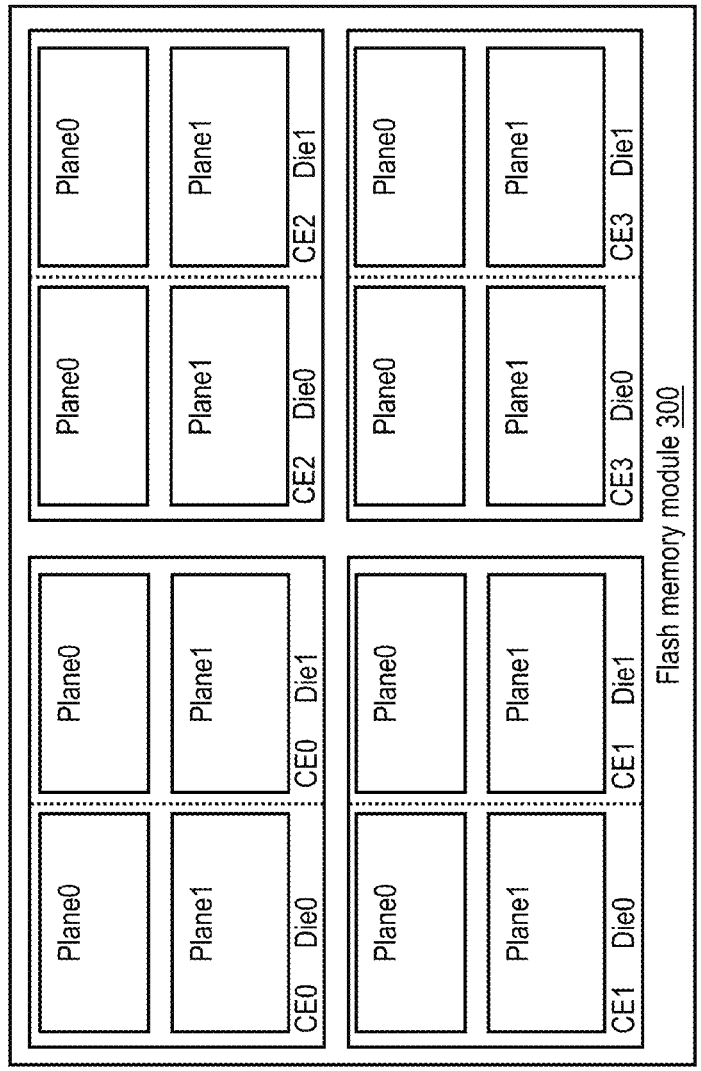

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
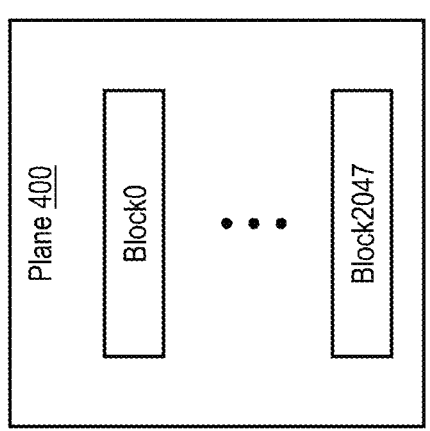
Figure 5:
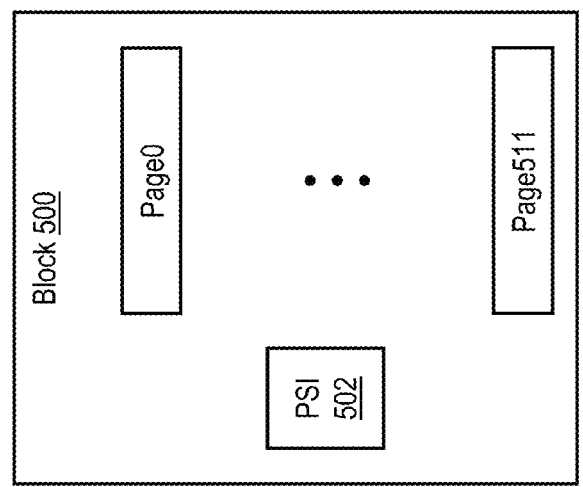

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

Because NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes page status information (PSI) 502, which indicates the status of each physical page in that block 500 as retired (i.e., no longer used to store user data) or non-retired (i.e., active or still usable to store user data). In various implementations, PSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
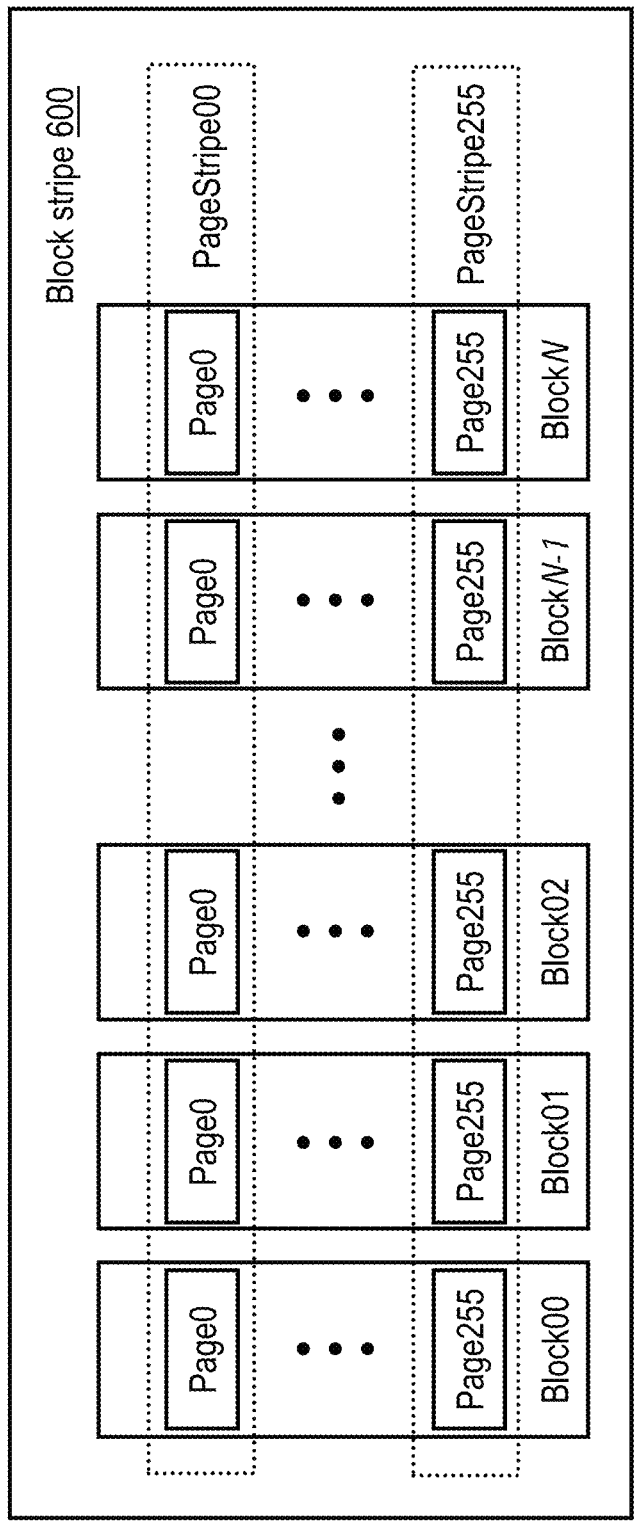
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
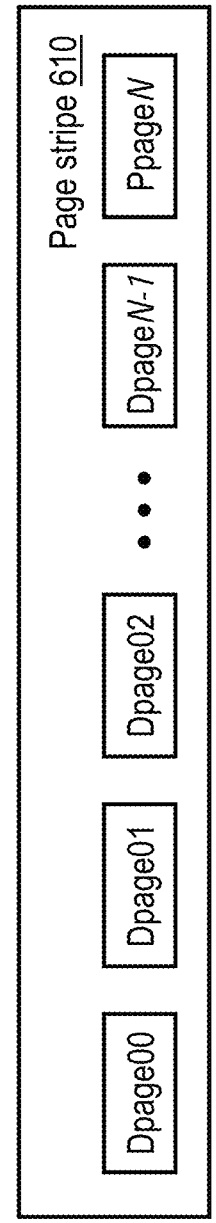
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704 and CRC field 706. In case data field 702 holds fractions of logical data pages, the LBA field 704 further holds information on which fractions of logical data pages are stored in the data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of the LBA fields 704 of the codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of the RTU queues 906 corresponding to its channel. For example, in one embodiment, RTU queues 906 include, for each channel, a respective RTU queue 906 for each of a plurality of block health grades. In various implementations, between 2 and 8 RTU queues 906 per lane (and a corresponding number of block health grades) have been found to be sufficient.

A build block stripes function 920 performed by flash management code running on the GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values) for each codeword in each page of the page stripe, and parity information for the page stripe in the allocated page stripe. The addition of associated metadata and parity information can be done as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on the GPP 132 utilizes to facilitate garbage collection. As noted above, through the write process, pages are invalidated, and therefore portions of the NAND flash memory system 150 become unused. The associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In various embodiments, garbage collector 912 considers both a DPBC and a DPCCC to select block stripes for garbage collection. Utilizing both a DPBC and a DPCCC to select block stripes for garbage collection facilitates consideration of both write amplification and read efficiency during garbage collection. In other embodiments, garbage collector 912 may further include properties of the current working conditions (e.g., workload properties such as current read and write rates, and the number of remaining free blocks). In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134. It should be appreciated that garbage collection, according to the present disclosure, may be performed on garbage collection units other than block stripes.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on the appropriate ready-to-use (RTU) queue 906 in the associated GPP memory 134.

Figure 9:
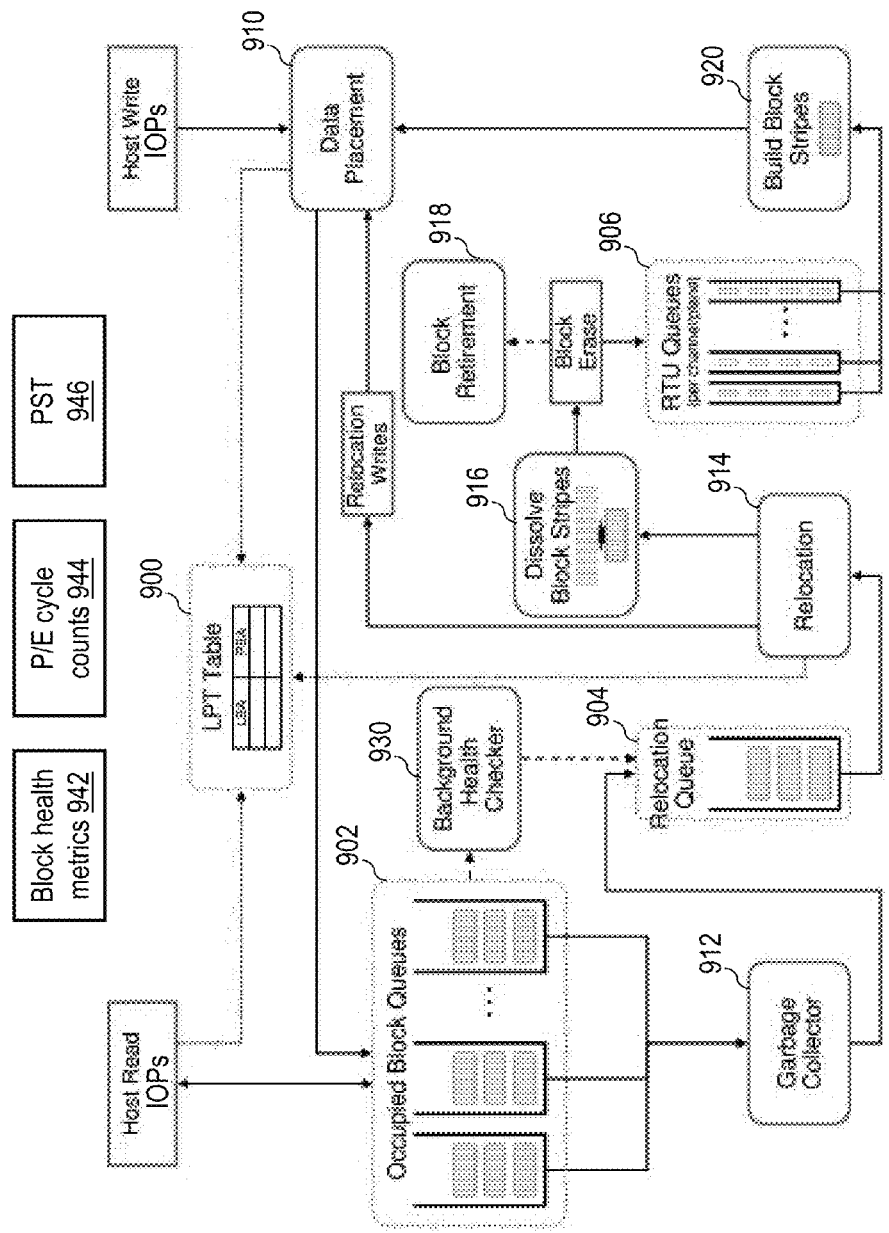
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of the block health metrics 942, background health checker 930 may place block stripes on relocation queue 904 for handling by relocation function 914.

Figure 10:
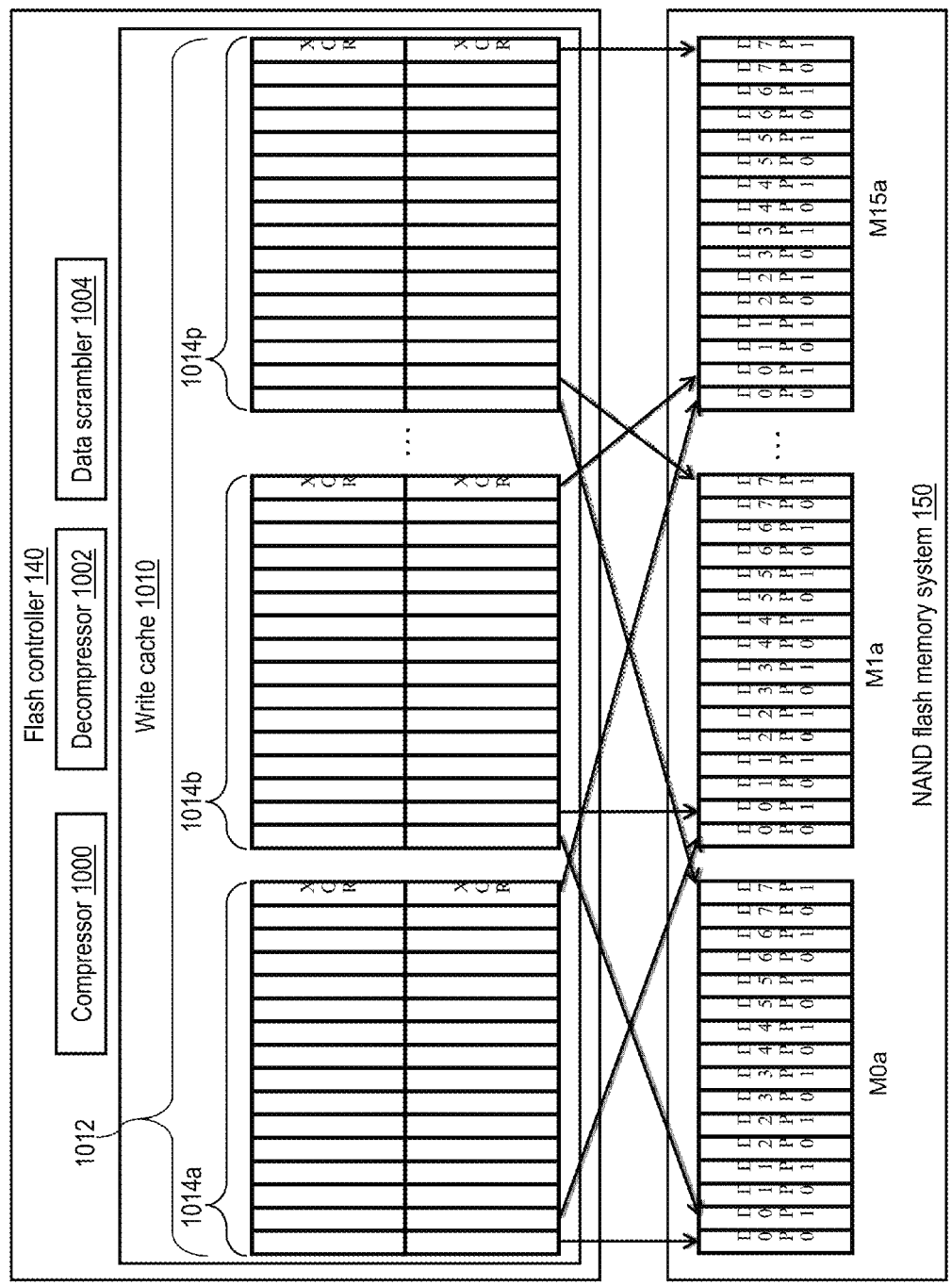
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0a, M0b, M1a, M1b, . . . , M1a, and M15b of a NAND flash memory system 150, for example, on a page-by-page basis rather than on a block-by-block basis. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 utilizes data scrambler 1004 to apply a predetermined data scrambling (i.e., randomization) pattern to data written to NAND flash memory 150 in order to improve endurance and mitigate cell-to-cell interference.

As further illustrated in FIG. 10, flash controller 140 includes a write cache 1010. Write cache 1010 includes storage for one or more cache lines 1012 for buffering write data in anticipation of writing the data to NAND flash memory system 150. In the illustrated embodiment, each cache line 1012 includes multiple (e.g., 16) segments 1014a-1014p, each providing storage for a respective page stripe of up to sixteen data pages (a maximum of fifteen data pages and one data protection page). As shown, for ease of implementation, it is preferred if flash controller 140 writes each page buffered in a given segment 1014 of cache line 1012 to the corresponding die index, plane index, and physical page index in each of sixteen flash memory modules. Thus, for example, flash controller 140 writes the data pages from segment 1014a to a first physical page (e.g., Page23) in each of flash memory modules M0a-M15a, writes the data pages from segment 1014b to a second physical page in each of flash memory modules M0a-M15a, and writes the data pages from segment 1014p to a sixteenth physical page in each of flash memory modules M0a-M15a.

Figure 11A:
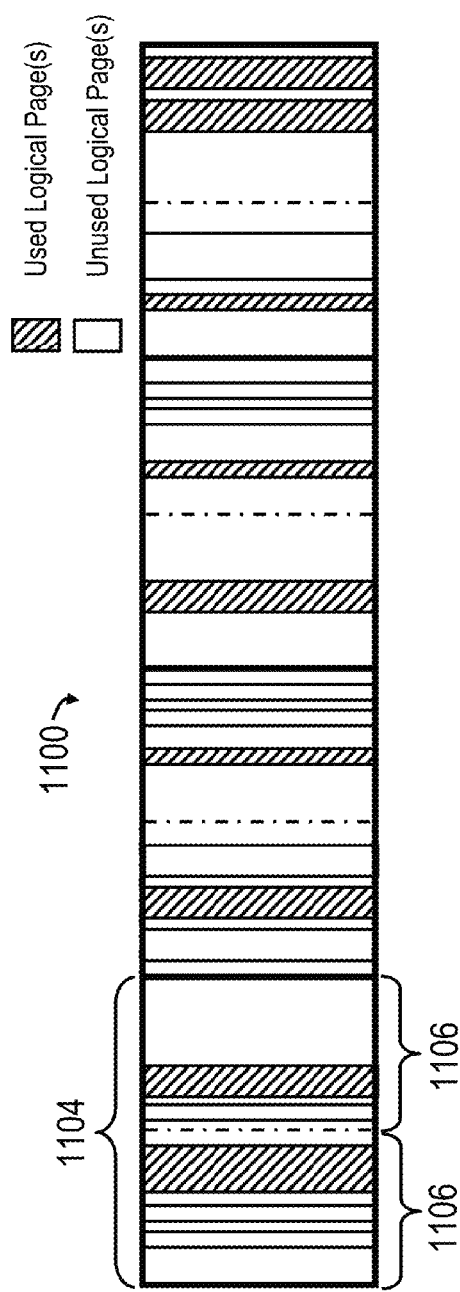
FIG. 11A depicts an exemplary flash block stripe.
Figure 11B:
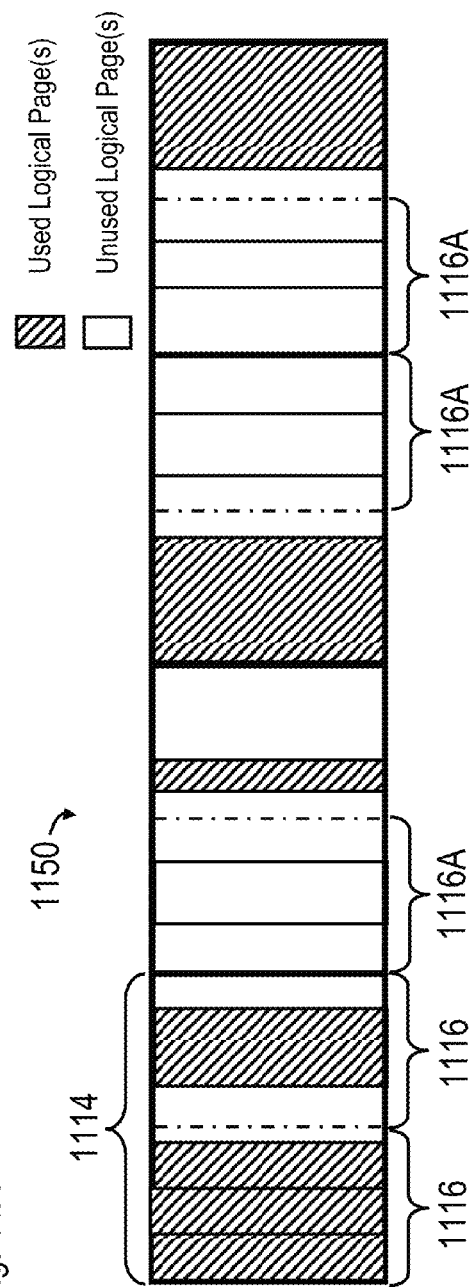
FIG. 11B depicts another exemplary flash block stripe.

With specific reference to FIGS. 11A and 11B, relevant portions of exemplary flash block stripes 1100 and 1150 are illustrated that include four respective physical pages 1104 and 1114 that each include two respective codewords (e.g., ECC codewords) 1106 and 1116.

According to one or more embodiments of the present disclosure, a number of flash block stripe characteristics are determined to facilitate selection of a flash block stripe for garbage collection. In one or more embodiments, a first flash block stripe characteristic that is determined is a maximum Dirty Physical Byte Count (DPBC), 'N', which corresponds to the total dirty physical byte count of a flash block stripe. A second flash block stripe characteristic that is determined is a codeword container size in bytes, 'X', which in the examples in FIGS. 11A and 11B is equal to 'N/8'. A third flash block stripe characteristic that is determined is a maximum Dirty Physical Codeword Container Count (DPCCC), 'NIX', which in the examples in FIGS. 11A and 11B is equal to '8'. The maximum DPCCC corresponds to the total number of codeword containers (e.g., ECC codeword containers) or minimum granularity that can be read to extract any usable uncorrupted information. For the sake of simplicity, the examples illustrated in FIGS. 11A and 11B show block stripes with only one single block with only four physical flash pages. However, the illustrated examples can be easily extended to block stripes consisting of multiple blocks as well as blocks with more pages. With specific reference to FIG. 11A, a relevant portion of an exemplary flash block stripe 1100 is illustrated that includes four physical flash pages 1104 that each include two codewords (e.g., ECC codewords) 1106. Flash block stripe 1100 includes highly compressible data and has a DPBC of approximately 0.8*N (i.e., approximately eighty percent of the maximum DPBC) and a DPCCC of zero (i.e., there are zero completely dirty codeword containers). Flash block stripe 1150 includes highly uncompressible data and has a DPBC of approximately 0.6*N (i.e., approximately sixty percent of the maximum DPBC) and a DPCCC of three (i.e., there are three completely dirty codeword containers 1116A).

Conventionally, a known garbage collection block stripe selection approach only looked at the number of still used logical pages to determine a garbage collection priority. In this case, the higher the dirty logical page count, the lower the write amplification a flash controller experienced during garbage collection. In the examples of FIGS. 11A and 11B, garbage collection on block stripe 1100 exhibits less write amplification than garbage collection on block stripe 1150. However, a block stripe selection technique according to the present disclosure may choose to perform garbage collection on block stripe 1150 (as contrasted with block stripe 1100) as block stripe 1150 only requires reading and decoding five (5) codeword containers, as contrasted with reading and decoding all eight (8) codeword containers in block stripe 1100. In general, flash controller garbage collection block stripe selection priority according to the present disclosure is a function of DPBC and DPCCC (i.e., F(DPBC, DPCCC) =block stripe selection priority). In another embodiment the block stripe selection priority may also be a function of DPBC, DPCCC, and additional working conditions such as workload properties (e.g., the current write rate or the current read rate) or the RTU levels.

The garbage collection function may or may not prioritize garbage collection on block stripe 1150 over block stripe 1100, even when reducing write amplification has priority over reducing read amplification. As one example, in the event a DPCCC is equivalent on two blocks and a DPBC is different, the block with the highest DPBC may be selected for garbage collection as the block with the highest DPBC is more write efficient (i.e., there are less still-valid bytes to re-write). As another example, in the event DPBC is equivalent on two blocks and DPCCC is different, the block with the highest DPCCC may be selected for garbage collection as the block with the highest DPCCC is more read efficient (i.e., there are less pages to read to extract still-valid data).

Figure 12:
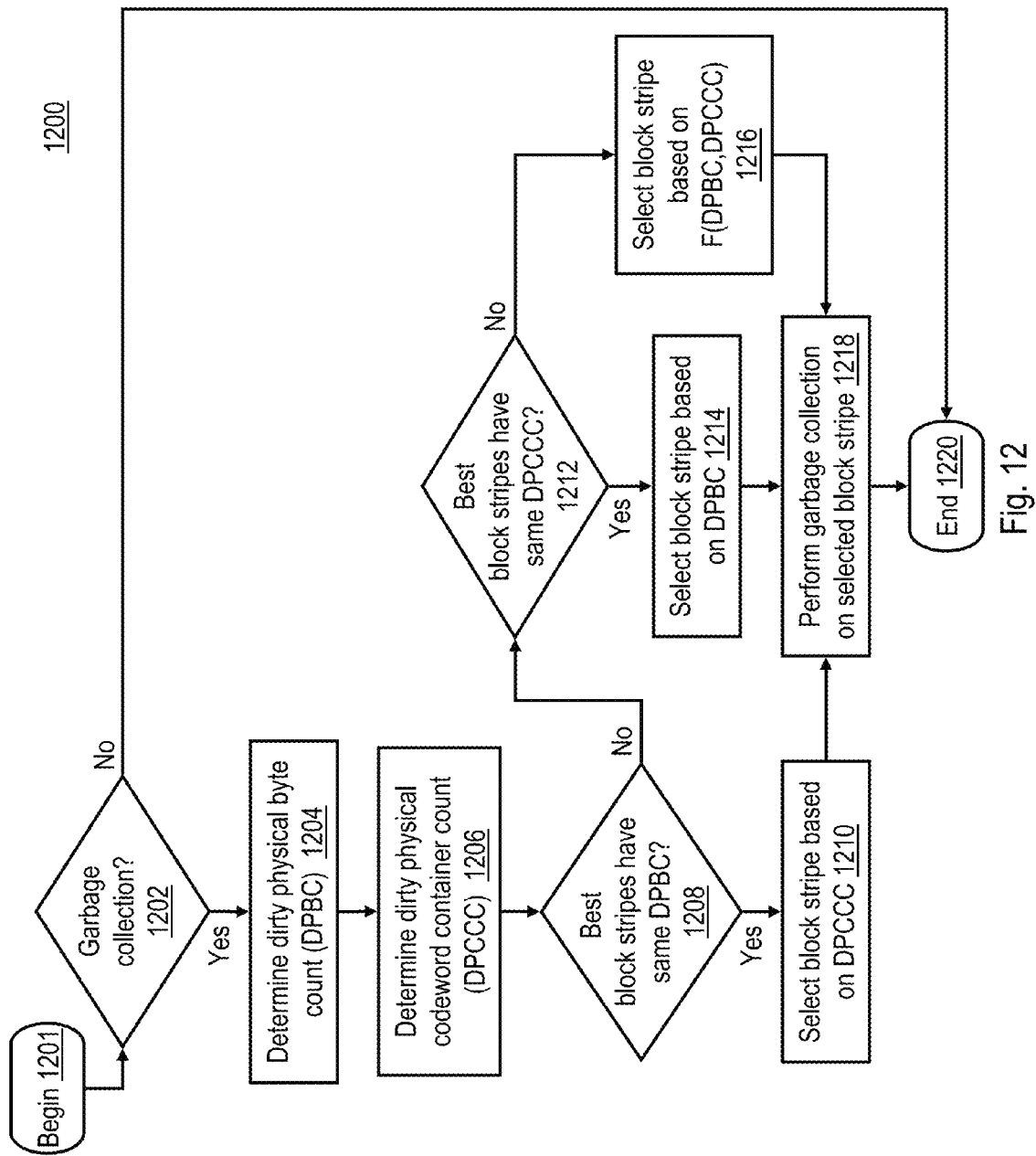
FIG. 12 is a high level logical flowchart of an exemplary process that performs garbage collection for a data storage system in accordance with one embodiment of the present disclosure.

With reference to FIG. 12, an exemplary process 1200 is illustrated that performs garbage collection for a data storage system in accordance with an embodiment of the present disclosure. Process 1200 may, for example, be performed by garbage collector 912 of FIG. 9. In one or more embodiments, process 1200 may be initiated periodically, by garbage collector 912, in block 1201 to determine, for example, whether available storage has fallen below a threshold level. Next, in decision block 1202, garbage collector 912 determines whether garbage collection is indicated (e.g., whether available storage has fallen below the threshold level). In response to garbage collection not being indicated in block 1202, control transfers to block 1220 where process 1200 terminates. In response to garbage collection being indicated in block 1202 control transfers to block 1204.

In block 1204 garbage collector 912 determines DPBCs for each garbage collection unit (e.g., block stripe) that is a candidate for garbage collection. For example, candidate block stripes may correspond to block stripes that have dirty page counts above a threshold level. It should be noted that the dirty page count may reflect either the number of dirty logical pages or dirty physical pages. Next, in block 1206, garbage collector 912 determines DPCCCs for each block stripe that is a candidate for garbage collection. Then, in decision block 1208, garbage collector 912 determines whether the candidate block stripes with the highest DPBC or the highest DPCCC have a same DPBC. The set of blocks stripes with the highest DBPC or the highest DPCCC are denoted as the best of the candidate block stripes hereafter. In response to the best of the candidate block stripes having the same DPBC control transfers to block 1210. In block 1210 garbage collector 912 selects block stripes for garbage collection based on DPCCC. Next, in block 1218, garbage collector 912 performs garbage collection on the selected block stripe. From block 1218 control transfers to block 1220. In response to the best of the candidate block stripes not having the same DPBC in block 1208 control transfers to decision block 1212.

In block 1212, garbage collector 912 determines whether the candidate block stripes with the highest DBPC or the highest DPCCC have a same DPCCC. In response to the best of the candidate block stripes having the same DPCCC in block 1212 control transfers to block 1214. In block 1214 garbage collector 912 selects a block stripe for garbage collection based on DPBC. Next, in block 1218, garbage collector 912 performs garbage collection on the selected block stripe. From block 1218 control transfers to block 1220. In response to the best of the candidate block stripes not having the same DPCCC in block 1212 control transfers to block 1216. In block 1216 garbage collector 912 selects a block stripe for garbage collection based on an implemented utility function of DPBC and DPCCC (i.e., F(DPBC, DPCCC)). For example, a utility function may be implemented as F(DPBC, DPCCC)=(A·DPBC)+(B·DPCCC) where A and B are constants. In one exemplary embodiment, A may be set equal to '1' and B may be set equal to a Codeword Container Size (CCS). It should be appreciated that the utility function should be considered in its broadest scope and not limited to the aforementioned example. Any mathematical function of DPBC and DPCCC, in general, can be used to build a utility function (e.g., F(DPBC, DPCCC)=MIN(A·DPBC, B·DPCCC) etc.). From block 1216 control transfers to block 1218, where garbage collector 912 performs garbage collection on the selected block stripe, and then to block 1220.

Figure 13:
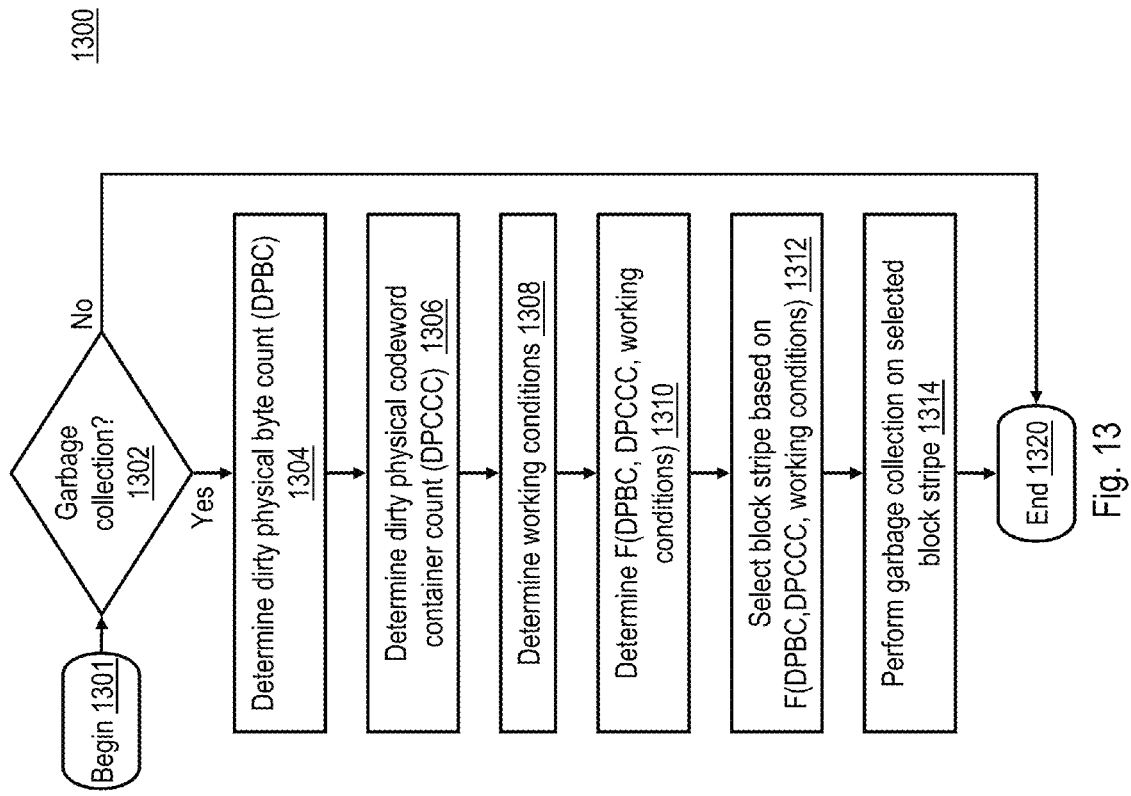
FIG. 13 is a high level logical flowchart of another exemplary process that performs garbage collection for a data storage system in accordance with another embodiment of the present disclosure.

FIG. 13 depicts another exemplary process 1300 that performs garbage collection for a data storage system in accordance with another embodiment of the present disclosure. Process 1300 may, for example, be performed by garbage collector 912 of FIG. 9. In one or more embodiments, process 1300 may be initiated periodically, by garbage collector 912, in block 1301 to determine, for example, whether available storage has fallen below a threshold level. Next, in decision block 1302, garbage collector 912 determines whether garbage collection is indicated (e.g., whether available storage has fallen below the threshold level). In response to garbage collection not being indicated in block 1302 control transfers to block 1320 where process 1300 terminates. In response to garbage collection being indicated in block 1302 control transfers to block 1304.

In block 1304 garbage collector 912 determines DPBCs for each garbage collection unit (e.g., block stripe) that is a candidate for garbage collection. For example, candidate block stripes may correspond to block stripes that have dirty page counts above a threshold level. It should be noted that the dirty page count may reflect either the number of dirty logical pages or dirty physical pages. Next, in block 1306, garbage collector 912 determines DPCCCs for each block stripe that is a candidate for garbage collection. In block 1308 garbage collector 912 determines Current Working Conditions (CWC), which may include a current write amplification, current read and write rates, current RTU levels, etc. Next, in block 1310 garbage collector 912 determines for each block stripe that is a candidate for garbage collection the utility function of DPBC, DPCCC, and CWC (i.e., F(DPBC, DPCCC, CWC)). In one example of this embodiment the utility function can be denoted as:

$$F(DPBC, DPCCC, CWC) = (A(CWC) \cdot DPBC) + (B(CWC) \cdot DPCCC)$$

In this case, A(CWC) and B(CWC) are functions of CWC. As an example, in order to favor lower additional write amplification over read efficiency, A(CWC) may be set equal to '1' if the current write rate is larger than a given threshold and the RTU level is low, and otherwise A(CWC) may be set equal to '2'. Similarly, one can favor read efficiency over additional write amplification by setting B(CWC) equal to CCS if the read rate is higher than a certain read rate threshold, and otherwise B(CWC) may be set equal to '2' times CCS. It should be noted that the utility function should be considered in its broadest scope and is not limited to the aforementioned example. Any mathematical function of DPBC, DPCCC, and CWC could be used to build a utility function. In block 1312 the garbage collector 912 selects a block stripe for garbage collection based on the utility function F(DPBC, DPCCC, CWC). From block 1312 control transfers to block 1314, where garbage collector 912 performs garbage collection on the selected block stripe, and then to block 1320.

Figure 14:
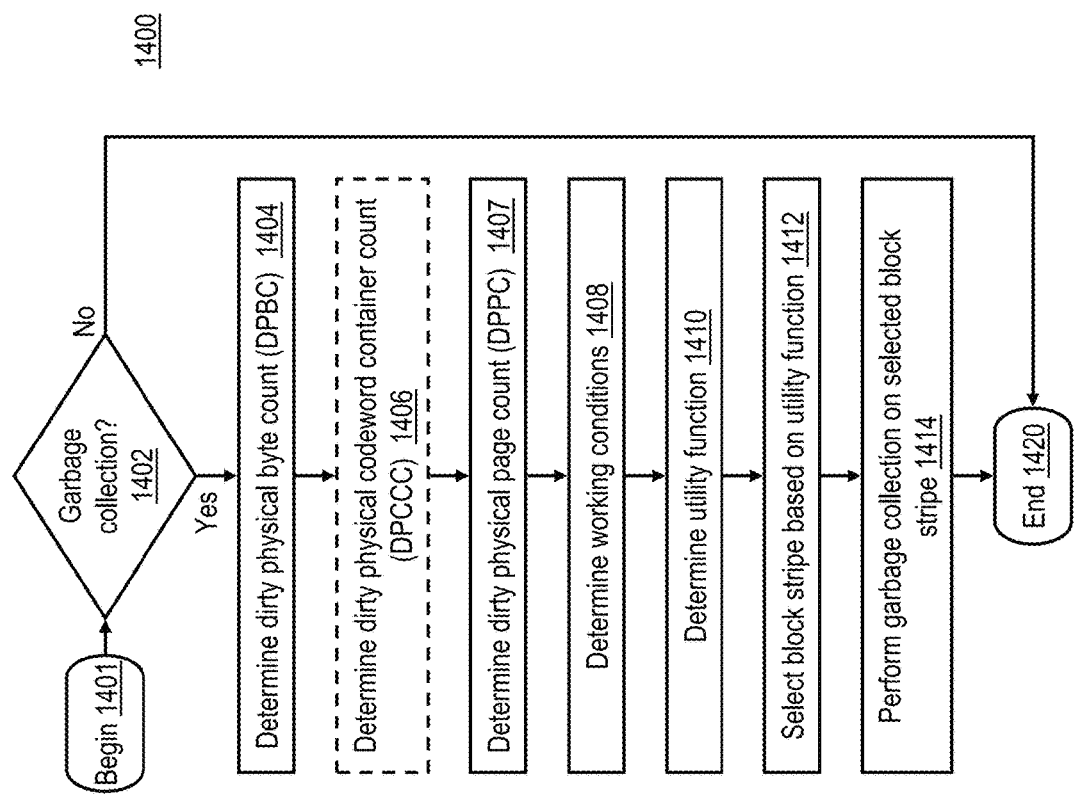
FIG. 14 is a high level logical flowchart of yet another exemplary process that performs garbage collection for a data storage system in accordance with another embodiment of the present disclosure.

In certain embodiments flash controller 150 may be limited to read entire flash pages. As a consequence, garbage collection has to read entire physical pages even though data from only one codeword may be have to be read for relocation. Hence, looking at DPBC and DPCCC may not be sufficient in this case as for example two candidate block stripes with equal DPBC and DPCCC may require a different number of page reads for relocation. In one embodiment process 1300 may be modified such that the garbage collection decision further takes into account a dirty physical page count (DPPC). The DPPC can either be utilized instead of the DPCCC or in addition to the DPCCC as is illustrated in FIG. 14, which depicts an exemplary process 1400 that performs garbage collection for a data storage system in accordance with another embodiment of the present disclosure. Process 1400 may, for example, be performed by garbage collector 912 of FIG. 9. In one or more embodiments, process 1400 may be initiated periodically, by garbage collector 912, in block 1401 to determine, for example, whether available storage has fallen below a threshold level. Next, in decision block 1402, garbage collector 912 determines whether garbage collection is indicated (e.g., whether available storage has fallen below the threshold level). In response to garbage collection not being indicated in block 1402 control transfers to block 1420 where process 1400 terminates. In response to garbage collection being indicated in block 1402 control transfers to block 1404.

In block 1404 garbage collector 912 determines DPBCs for each garbage collection unit (e.g., block stripe) that is a candidate for garbage collection. For example, candidate block stripes may correspond to block stripes that have dirty page counts above a threshold level. As previously noted, the dirty page count may reflect either the number of dirty logical pages or dirty physical pages. Process 1400 then continues with optional block 1406 or proceeds directly to block 1407 in case optional step 1406 is skipped. In optional block 1406, garbage collector 912 determines DPCCCs for each block stripe that is a candidate for garbage collection. In block 1407 garbage collector 912 determines DPPCs for each block stripe that is a candidate for garbage collection. In block 1408 garbage collector 912 determines Current Working Conditions (CWC), which may include a current write amplification, current read and write rates, current RTU levels, etc. Next, in block 1410 garbage collector 912 determines for each block stripe that is a candidate for garbage collection the utility function of DPBC, DPCCC, DPPC, and CWC (i.e., F(DPBC, DPCCC, DPPC, CWC)) or the utility function of DPBC, DPPC, and CWC (i.e., F(DPBC, DPPC, CWC)). In one example of this embodiment the utility function can be denoted as:

$$F(DPBC, DPCCC, DPPC, CWC) = (A(CWC) \cdot DPBC) + (B(CWC) \cdot DPCCC) + (C(CWC) \cdot DPPC)$$

In this case, A(CWC), B(CWC), and C(CWC) are functions of CWC.

As one example, in order to favor lower additional write amplification over read efficiency, A(CWC) may be set equal to '1' if the current write rate is larger than a given threshold and the RTU level is low, and otherwise A(CWC) may be set equal to '2'. Similarly, one can favor read efficiency over additional write amplification by setting B(CWC) equal to CCS if the read rate is higher than a certain read rate threshold, and otherwise B(CWC) may be set equal to '2' times CCS. In addition, read efficiency can be further improved by setting C(CWC) equal to CCS times the number of codewords per page (CPP), and otherwise C(CWC) may be set to '2' times CCS times CPP. It should be noted that the utility function should be considered in its broadest scope and is not limited to the aforementioned example. Any mathematical function of DPBC, DPPC, and CWC and/or DPBC, DPCCC, DPPC, and CWC could be used to build a utility function. In block 1412 the garbage collector 912 selects a block stripe for garbage collection based on the implemented utility function. From block 1412 control transfers to block 1414, where garbage collector 912 performs garbage collection on the selected block stripe, and then to block 1420.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, businessrelated, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of garbage collection in a data storage system, comprising:
   determining, by a garbage collector, a dirty physical byte count for each of a plurality of candidate garbage collection units, wherein the dirty physical byte count provides a total amount of dirty bytes;
   determining, by the garbage collector, at least one of a dirty physical codeword container count and a dirty physical page count for each of the candidate garbage collection units, wherein the dirty physical codeword container count provides an amount of physical codeword containers that are completely dirty and the dirty physical page count provides an amount of physical pages that are completely dirty; and
   selecting, by the garbage collector, a garbage collection unit, included in the candidate garbage collection units, for garbage collection based on the dirty physical byte count and at least one of the dirty physical codeword container count and the dirty physical page count.

2. The method of claim 1, further comprising:
   performing garbage collection on the selected garbage collection unit.

3. The method of claim 1, further comprising:
   in response to the dirty physical byte count for multiple of the candidate garbage collection units being the same, selecting the garbage collection unit for garbage collection to maximize read efficiency.

4. The method of claim 1, further comprising:
   in response to the dirty physical codeword container count for multiple of the candidate garbage collection units being the same, selecting the garbage collection unit for garbage collection to minimize write amplification.

5. The method of claim 1, further comprising:
   selecting the garbage collection unit for garbage collection based only on the dirty physical byte count and the dirty physical page count.

6. The method of claim 1, further comprising:
   selecting the garbage collection unit for garbage collection based on the dirty physical byte count, the dirty physical codeword count, and the dirty physical page count.

7. The method of claim 1, further comprising:
   determining current working conditions for the data storage system;
   implementing a utility function that is a function of the dirty physical byte count, the dirty physical codeword container count, and the current working conditions; and
   selecting the garbage collection unit, included in the candidate garbage collection units, for garbage collection based on the utility function.

8. The method of claim 7, wherein the utility function favors higher read efficiency when a read rate is above a threshold.

9. The method of claim 7, wherein the utility function favors lower write amplification when a write rate is above another threshold.

10. A data storage system, comprising:
    a flash controller memory; and
    a flash controller coupled to the flash controller memory, wherein the flash controller is configured to:
       determine a dirty physical byte count for each of a plurality of candidate garbage collection units, wherein the dirty physical byte count provides a total amount of dirty bytes;
       determine at least one of a dirty physical codeword container count and a dirty physical page count for each of the candidate garbage collection units, wherein the dirty physical codeword container count provides an amount of physical codeword containers that are completely dirty and the dirty physical page count provides an amount of physical pages that are completely dirty; and
       select a garbage collection unit, included in the candidate garbage collection units, for garbage collection based on the dirty physical byte count and at least one of the dirty physical codeword container count and the dirty physical page count.

11. The data storage system of claim 10, wherein the flash controller is further configured to:
    perform garbage collection on the selected garbage collection unit.

12. The data storage system of claim 10, wherein the flash controller is further configured to:
    in response to the dirty physical byte count for multiple of the candidate garbage collection units being the same, select the garbage collection unit for garbage collection to maximize read efficiency.

13. The data storage system of claim 10, wherein the flash controller is further configured to:
    in response to the dirty physical codeword container count for multiple of the candidate garbage collection units being the same, select the garbage collection unit for garbage collection to minimize write amplification.

14. The data storage system of claim 10, wherein the flash controller is further configured to:
    determine current working conditions for the data storage system;
    implement a utility function that is a function of the dirty physical byte count, the dirty physical codeword container count, and the current working conditions; and
    select the garbage collection unit, included in the candidate garbage collection units, for garbage collection based on the utility function.

15. The data storage system of claim 14, wherein the utility function favors higher read efficiency when a read rate is above a threshold.

16. The data storage system of claim 14, wherein the utility function favors lower write amplification when a write rate is above another threshold.

17. A computer program product, the computer program product comprising a computer readable storage medium having program instructions embodied therewith, the program instructions executable by a data storage system, to cause the data storage system to:
    determine a dirty physical byte count for each of a plurality of candidate garbage collection units, wherein the dirty physical byte count provides a total amount of dirty bytes;
    determine at least one of a dirty physical codeword container count and a dirty physical page count for each of the candidate garbage collection units, wherein the dirty physical codeword container count provides an amount of physical codeword containers that are completely dirty and the dirty physical page count provides an amount of physical pages that are completely dirty; and select a garbage collection unit, included in the candidate garbage collection units, for garbage collection based on the dirty physical byte count and at least one of the dirty physical codeword container count and the dirty physical page count.

18. The program product of claim 17, wherein the program instructions further cause the data storage system to:
perform garbage collection on the selected garbage collection unit.

19. The program product of claim 17, wherein the program instructions further cause the data storage system to:
in response to the dirty physical byte count for multiple of the candidate garbage collection units being the same, select the garbage collection unit for garbage collection to maximize read efficiency.

20. The program product of claim 17, wherein the program instructions further cause the data storage system to:
in response to the dirty physical codeword container count for multiple of the candidate garbage collection units being the same, select the garbage collection unit for garbage collection to minimize write amplification.

\* \* \* \* \*